(12) United States Patent
Chang et al.

(10) Patent No.: US 6,541,925 B1
(45) Date of Patent: Apr. 1, 2003

(54) RESONANT CONVERTER CIRCUIT WITH SUPPRESSION OF TRANSIENTS DURING CHANGES IN OPERATING CONDITION

(75) Inventors: Chin Chang, Yorktown Heights, NY (US); Joseph En-Cheng Chang, Norwich, NY (US); Gert W. Bruning, No. Tarrytown, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 312 days.

(21) Appl. No.: 09/195,297

(22) Filed: Nov. 18, 1998

(51) Int. Cl.$^7$ ............................................. H05B 37/02
(52) U.S. Cl. .................... 315/291; 315/209 R; 315/307
(58) Field of Search ................................. 315/307, 291, 315/209 R, 244, 224, DIG. 7, 294, 295, 308

(56) References Cited

U.S. PATENT DOCUMENTS

| | | | |
|---|---|---|---|
| 4,685,040 A | 8/1987 | Steigerwald et al. | 363/17 |
| 5,424,614 A | 6/1995 | Maheshwari | 315/209 |
| 5,583,402 A | * 12/1996 | Moisin et al. | 315/307 |

* cited by examiner

Primary Examiner—Don Wong
Assistant Examiner—Wilson Lee
(74) Attorney, Agent, or Firm—Michael E. Belk

(57) ABSTRACT

A resonant converter which may be employed as an electronic ballast for a gas discharge lamp, the converter being in the form of a full or half bridge circuit which includes at least a pair of power switches such as MOSFET's. The gates of the switches are actuated by substantially square wave cyclic gating signals having complementary duty cycle ratios and a frequency somewhat above a resonant frequency of the converter circuit. The energy supply to the lamp is variable in accordance with the duty cycle ratios of the gating signals. In order to avoid generation of high voltage and current transients in the converter when a change in operating state requiring a substantial change in duty cycle ratios of the gating signals is to be performed, as when effecting turn-on or turn-off of the lamp, the changes in the duty cycle ratio are ramped to occur incrementally over several cycles of the gating signals rather than directly to required final values of the duty cycle ratios.

4 Claims, 5 Drawing Sheets

RESONANT CONVERTER CIRCUIT WITH SUPPRESSION OF TRANSIENTS DURING CHANGES IN OPERATING CONDITION

BACKGROUND OF THE INVENTION

1. Field of the Invention

This invention relates to resonant converters such as commonly used as an electronic ballast for fluorescent and other gas discharge lamps, and more particularly to a resonant converter which can provide a change in operating condition, such as lamp turn-on or turn-off, while suppressing generation of high voltage and current transients.

2. Description of the Related Art

A well-known half-bridge resonant converter circuit which is commonly used as an electronic ballast for fluorescent and other gas discharge lamps is shown in FIG. 1A. Therein a power source 1 supplies a DC input voltage $V_{in}$ across a pair of series connected electronic switches $Q_1$, $Q_2$ which may be power MOSFET's, the gates of which are actuated by substantially square wave gating signals $V_{GS1}$ and $V_{GS2}$ which are complementary; i.e., $V_{GS2}$ has a duty ratio D and $V_{GS1}$ has a duty ratio (1−D), where D is the ratio of ON time to period of the signal. The power source 1 may comprise a full wave rectifier followed by a preconditioner circuit, as shown in U.S. pat. No. 5,742,134, issued Apr. 21, 1998, assigned to Philips Electronics N.A. Such gating signals are supplied by a conventional square wave generator 3. The frequency of the gating signals may be of the order of 45 kHz. Connected across switch $Q_2$, in series, are a blocking capacitor $C_b$, inductor $L_r$ and the primary winding of a step-up isolation transformer T having a primary magnetizing inductance $L_m$ which is shunted by a capacitor $C_r$. The inductor $L_r$ and capacitor $C_r$ have a resonant frequency which is somewhat below the gating signal frequency. An output voltage $V_O$ is produced across the secondary winding of the transformer T, and is applied to a fluorescent lamp connected thereto represented by a resistance $R_1$ in series with a current limiting capacitance $C_1$.

The circuit will be described starting from an initial state in which the lamp is off. It is assumed that the lamp is of the instant-start type which requires a starting voltage in the vicinity of 550 volts rms. During the "on" portion or "1" state of each; a cycle of gating signal $V_{GS1}$ it turns switch $Q_1$ ON. The input voltage $V_{in}$, typically about 250 volts DC, then produces current in the path including $C_b$, $L_r$ and $L_m$ and also charges capacitance $C_r$. Capacitance $C_b$ is much larger than $C_r$ and serves only a blocking function to prevent DC from reaching transformer T. When gating signal $V_{GS1}$ returns to the "0" state it turns switch $Q_1$ OFF, and simultaneously gating signal $V_{GS2}$ turns switch $Q_2$ ON. The energy stored in inductance $L_r$ and capacitance $C_r$ then results in a very large reactive voltage across the transformer primary winding inductance $L_m$, since the voltage gain in the vicinity of the resonant frequency of $L_r$ and $C_r$ can be 10 to 15 or even greater. That is still further amplified by the step-up turns ratio of transformer T, and so it is readily achieved that adequate starting voltage is applied to the lamp to cause it to start-up.

After the lamp has ignited the lamp resistance $R_1$ loads the resonant circuit, reducing the effective gain. Cyclic operation then continues at a frequency somewhat above the resonant frequency, producing a sufficiently high voltage to maintain the lamp in the ON condition. When it is desired to turn the lamp off the gating signal $V_{GS1}$ applied to switch $Q_1$ is turned off. It is thereby switched to the "0" state (duty ratio=0), remaining open, so that voltage is no longer supplied to the resonant circuit. At the same time, the common practice is to also turn gating signal $V_{GS2}$ to the ON state (duty cycle=1), so that switch $Q_2$ remains closed. The reactive energy existing in the resonant circuit at the instant turn-off is commenced will again result in a very large transient voltage across the transformer winding and also across inductance $L_r$ which will then decay over an interval determined by the time constant of the reactive circuit loop.

The large reactive voltages and current produced in the converter circuit during lamp turn-on and turn-off requires the circuit designer to use circuit elements rated for voltages and currents many times the levels encountered during steady state circuit operation after the lamp has been turned on. That significantly increases the cost of the converter circuit. In addition, during turn-off the cyclic reactive voltage produced across the transformer winding may be sufficient to cause low frequency re-ignition of the lamp during several of the reactive cycles, causing repeated flickering which can be quite disturbing to an observer.

SUMMARY OF THE INVENTION

Accordingly, an object of the present invention is to provide a resonant converter which, while still providing an adequate instant-start voltage for a fluorescent or other gas discharge lamp, suppresses generation of the excessive transient reactive voltages and currents conventionally produced during lamp turn-on and turn-off. A further object is to provide definite turn-off of the lamp, without cyclic production of reactive voltages sufficient to cause low frequency repetitive re-ignition of the lamp.

Applicants have found that these objectives can be achieved by appropriate control of the duty ratios of the cyclic gating signals $V_{GS1}$ and $V_{GS2}$ which are supplied to the switches in the converter circuit. In particular, instead of immediate transition of each gating signal to or from the completely on or completely off state, the duty ratios of the gating signals are swept so as to incrementally reach the required altered duty ratio over several cycles of the gating signals. For lamp turn-on, the duty cycle of gating signal $V_{GS1}$ is swept over several cycles from 0% (constant OFF) to 50% (ON time=OFF time), while simultaneously the duty ratio of gating signal $V_{GS2}$ is swept over several cycles from 100% (constant ON) to 50% (ON time=OFF time). For lamp turn-off, the aforesaid sweeps of the duty cycles of the gating signals are reversed. Applicants have also found that control of the duty ratios of the gating signals may be employed to efficiently control the intensity of the light produced by the lamp, as contrasted with conventional control of light intensity by alteration of the cyclic frequency of the gating signals.

Such gradual alteration of the duty ratios of the cyclic gating signals has been found to substantially suppress generation of high voltage and current transients during lamp turn-on or turn-off, as well as low frequency repeated re-ignition of the lamp during turn-off.

BRIEF DESCRIPTION OF THE DRAWINGS

The invention will now be described in more detail with reference to the accompanying drawings, wherein.

DESCRIPTION OF THE PREFERRED EMBODIMENTS

Figure 1:
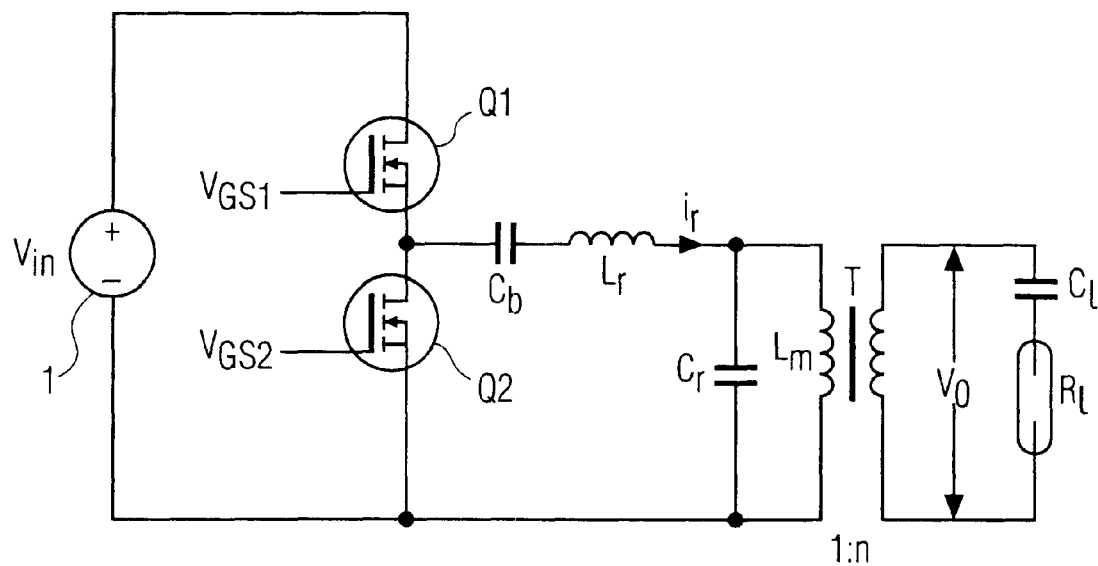
FIG. 1A is a circuit drawing of a typical prior art half-bridge resonant converter used as an electronic ballast for a gas discharge lamp.
FIG. 1B is a circuit drawing of a modification of FIG. 1A in accordance with the present invention.

The converter circuit in FIG. 1 has a voltage gain $A(\omega)$ which can be readily evaluated by known approximation for the case in which there is symmetrical drive of switches $Q_1$ and $Q_2$; that is, each switch operating at a duty ratio of 50%. If asymmetrical but complementary gating signals are supplied by square wave generator 5; e.g. $V_{GS2}$ has a duty ratio D and $V_{GS1}$ has a duty ratio (1–D), the converter voltage gain then becomes $$A_d(\omega) = \frac{1 - \cos(2\pi(1-D))}{2} A(\omega).$$

Correspondingly, the voltage across capacitor $C_b$ becomes $$V_{Cb} = (1-D)V_{in}$$

during steady state operation of the converter. These equations are the foundation based on which control of the duty ratios can be used to achieve smooth start-up and shut-down of converter operation while suppressing generation of high voltage and current transients. From equation (1) it is seen that as D approaches either zero or 100% the gain approaches zero, whereas for D=50% the gain is maximized.

Figure 2:
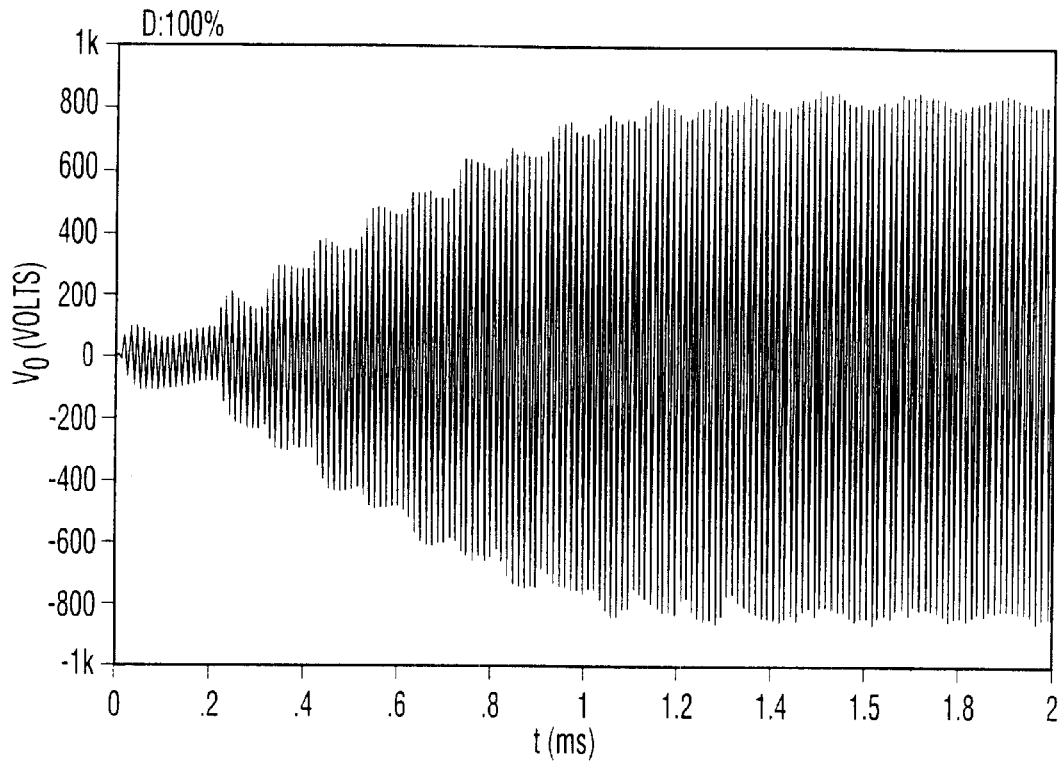
FIGS. 2, 3 and 4 show, during start-up in accordance with the invention, the smooth transitions which are obtained in the output voltage $V_0$, the resonant current in inductor $L_r$ and the blocking capacitor voltage $V_{Cb}$ respectively.
Figure 3:
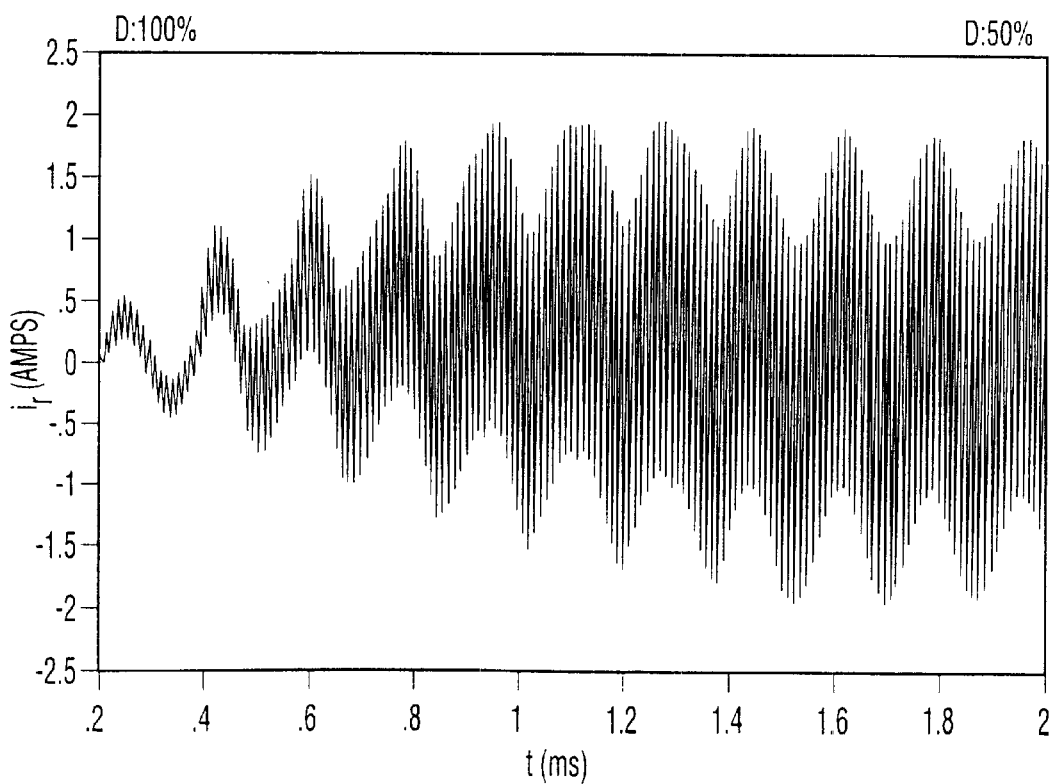
Figure 4:
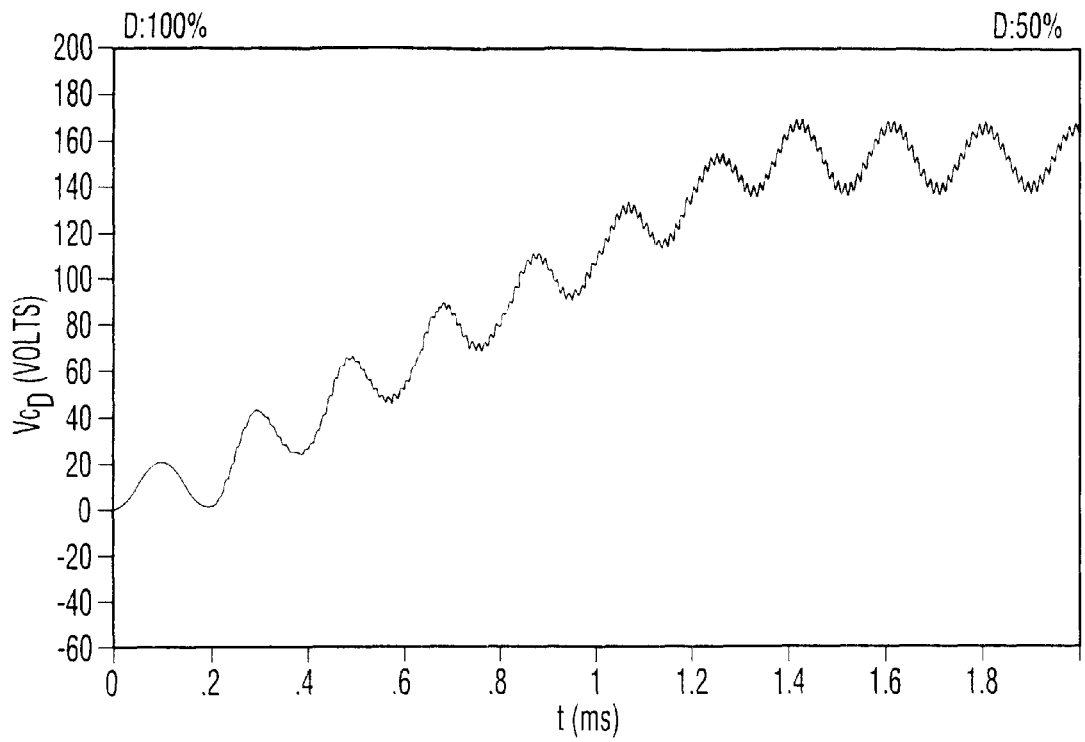

Start-up will be described from a starting condition in which all the energy storing components are fully discharged (except possibly an electrolytic capacitor included in the output of the power source 1). At time 0 the duty ratios of the power switches $Q_1$, $Q_2$ begin to be swept asymmetrically from 0% to 50% for $Q_1$ and from 100% to 50% for $Q_2$. The switching frequency $\omega$ is constant at a value somewhat above the resonant frequency of the converter circuit, while the sweep frequency at which the duty ratio is changed by square wave generator 5; is much lower and provides an approximately 5% step difference in D per cycle of the switching frequency. FIGS. 2, 3 and 4 show the results thereby obtained, providing smooth start-up of the output voltage $V_0$, the resonant current in the inductor $L_r$, and the blocking capacitor voltage $V_{cb}$, respectively.

Figure 5:
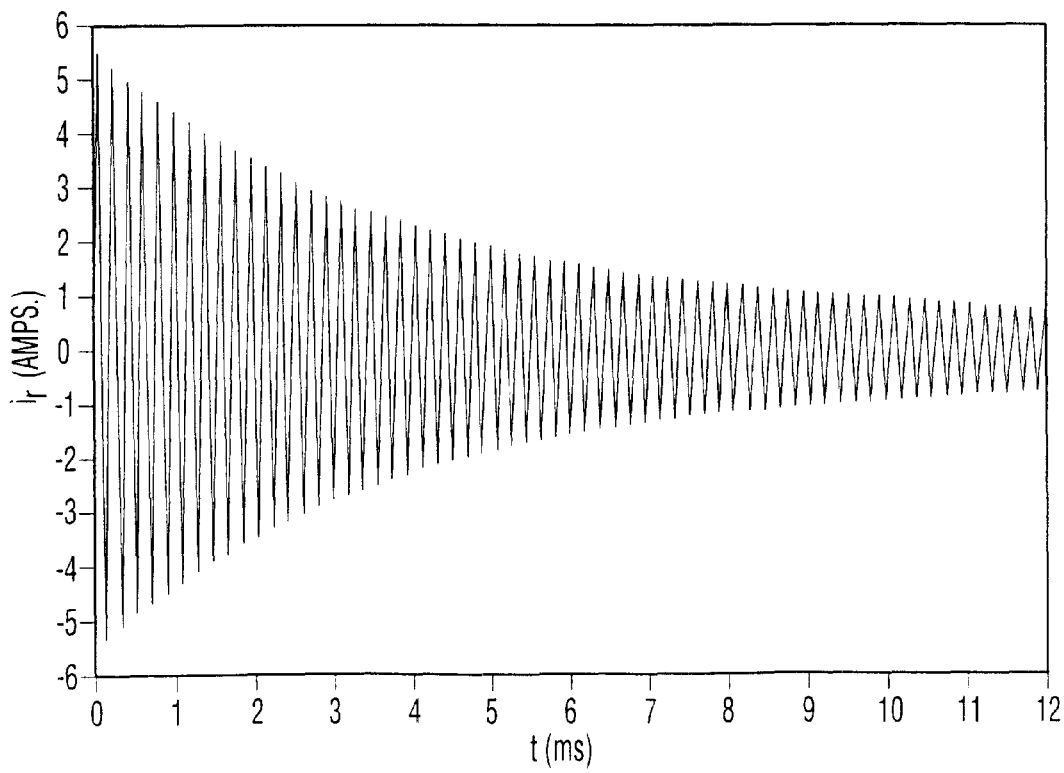
FIGS. 5 and 6 show the excessive low frequency oscillation which occurs in the inductor current and the blocking capacitor voltage during conventional start-up in which the switches $Q_1$, $Q_2$ are directly driven from their initial states (0% and 100%) to a final state of D=50%.
Figure 6:
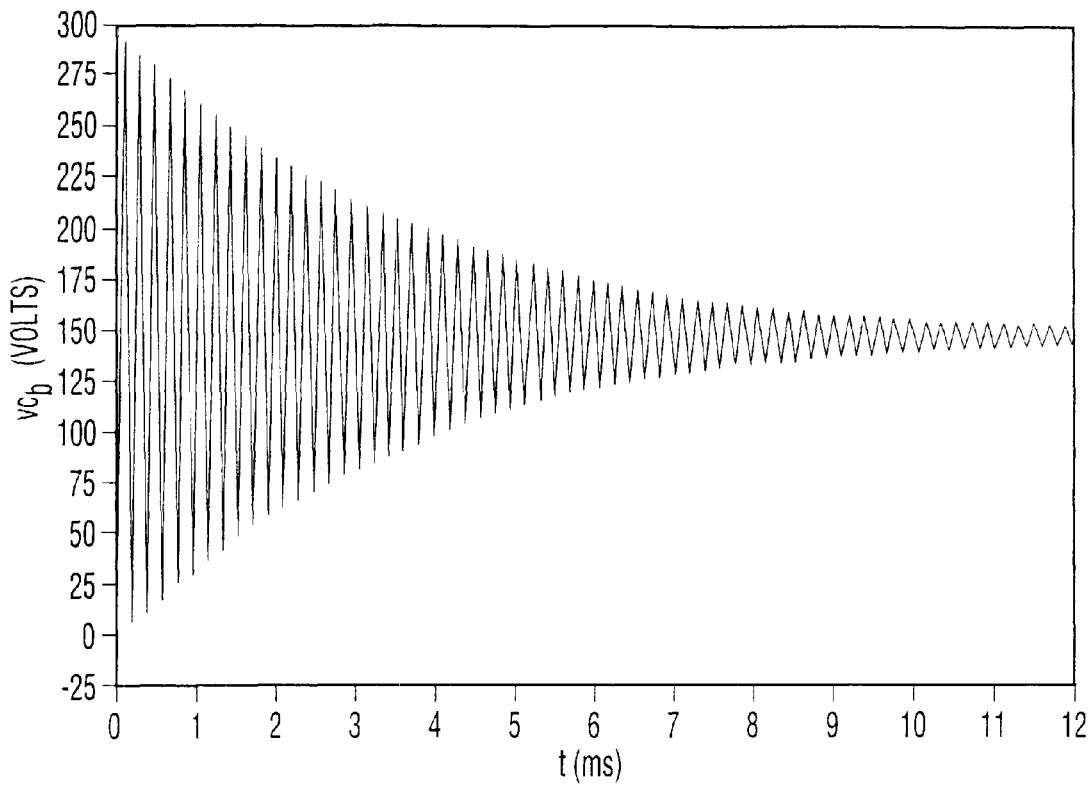

The mechanism of this improvement is based on the following. At time 0, the voltage across capacitor $C_b$ is 0. If the switches $Q_1$ and $Q_2$ were then at once driven by gating signals having a duty ratio D=50%, a low frequency resonant mode of $C_b$, $L_r$ and $L_m$ is excited by a step voltage input of magnitude 0.5 $V_{in}$. This generates exaggerated low frequency oscillation of inductor current and capacitive voltage as shown in FIGS. 5 and 6. In contrast thereto, in accordance with the invention, an equivalent ramp voltage is supplied by square wave generator 5; to the oscillatory circuit to produce start-up. Appropriate choice of the slope of the ramp leads to greatly reduced low frequency oscillation.

Consider now the operating conditions during turn-off of the lamp. The conventional procedure is to turn switch $Q_1$ off and turn switch $Q_2$ on at the same time. In that way, the energy stored in the high-frequency resonant circuit is released in part through the load and in part transferred to capacitor $C_b$. It should be noted that the amount of energy stored in capacitor $C_b$ is much greater than that stored in the resonant circuit. Consequently, the charging and discharging of $C_b$ during start-up and shut-down are the main causes of the low frequency oscillation. This explains why ramping of the duty cycles of the switches $Q_1$, achieves fast shut-down without low frequency oscillation.

Figure 7:
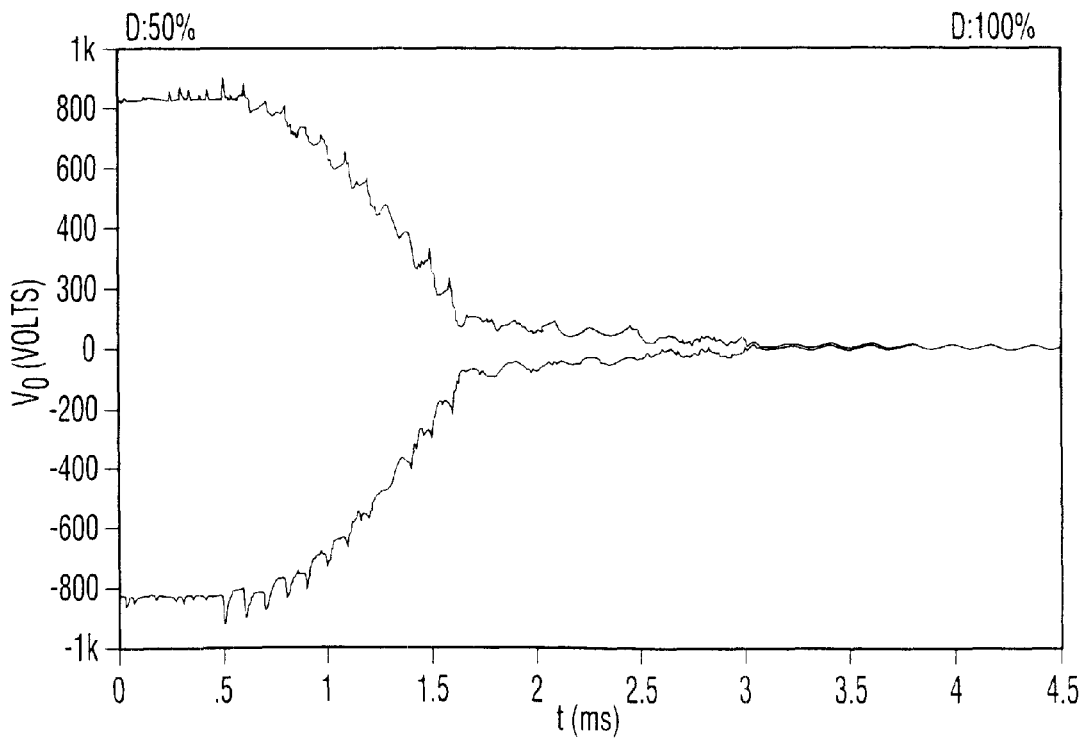
FIGS. 7, 8 and 9 respectively show, during lamp turn-off in accordance with the invention, the smooth transitions which are obtained in the output voltage $V_0$, the resonant current in inductor $L_r$ and the blocking capacitor voltage $V_{Cb}$.
Figure 8:
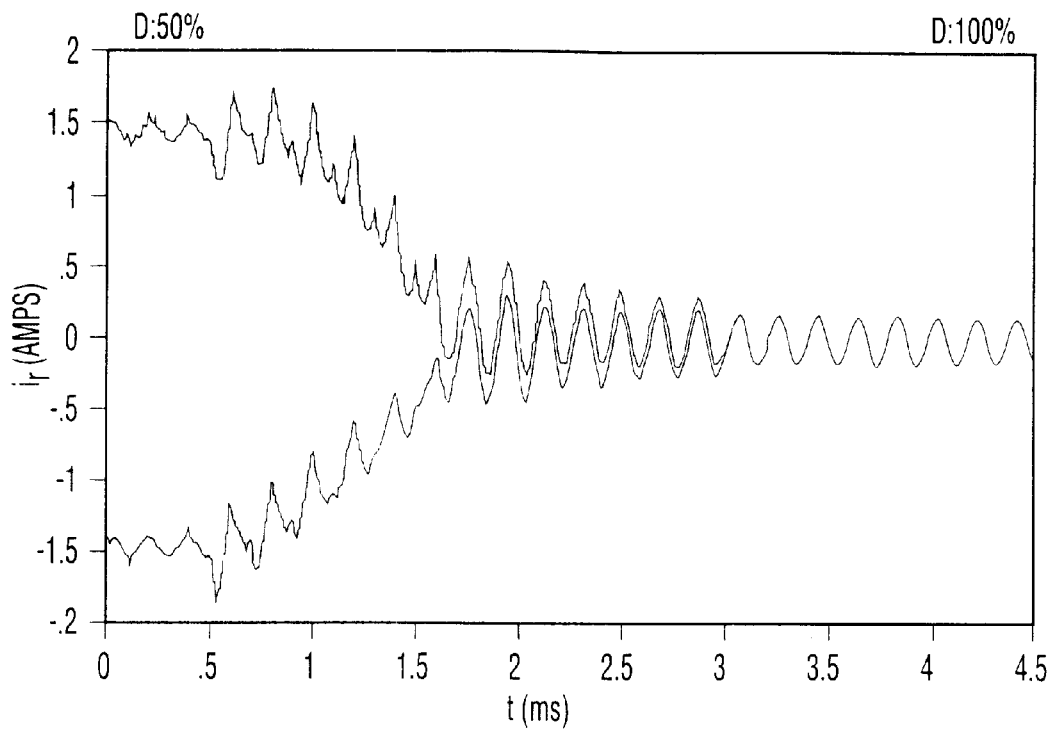
Figure 9:
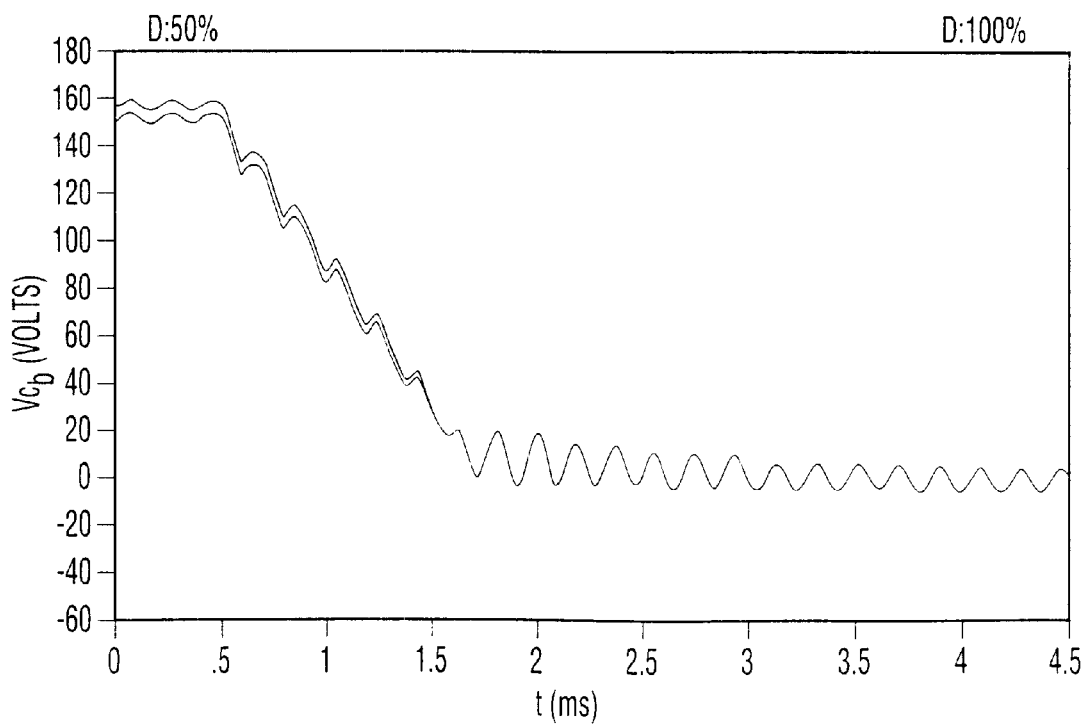

Assume that the converter is running in steady state with $V_{cb}=0.5 \ V_{in}$ and D=50%, and that at time 0 turn-off is commenced by starting to sweep the duty ratio D of switch $Q_2$ from 50% to 100% and of switch $Q_1$ from 50% to 0%. The sweep or "ramp" frequency is much below the switching frequency, with a 5% step difference in duty ratio per cycle. The results obtained are shown in FIGS. 7, 8 and 9, providing smooth shut-down of the output voltage $V_0$, the current in inductor $L_r$, and the voltage of blocking capacitor $C_b$, respectively. That is obtained because the power input to the oscillatory circuit becomes smaller as D increases, and so the output power is increasingly provided by capacitor $C_b$. That gradually releases the energy stored therein.

It should be noted that the described ramping of the duly cycle to provide start-up and shut-down applies equally to full-bridge as well as half-bridge converters. Also, the step difference of the duty ratio sweep per cycle can range anywhere between 1% and 10%.

In the interest of clarity and completeness the invention has been described with reference to certain preferred features thereof. However, it will be apparent to those skilled in the art that various adaptations and modifications thereof may be made without departing from the essential teachings and scope of the invention as set forth in the ensuing claims.

What is claimed is:

1. A method of operation of a resonant converter which is adapted for use as a ballast circuit for controlling operation of a gas discharge lamp connected thereto, the converter being in a form of a full or half-bridge circuit having at least first and second power switches which are respectively actuated by first and second cyclic gating signals of substantially the same frequency, the gating signal frequency being above a resonant frequency of said converter, the first and second gating signals being substantially square waves having complementary duty ratios; said method comprising:

effecting a change in operating state of said converter by increasing the duty ratio of the first gating signal by a selected proportion and decreasing the duty ratio of the second gating signal by the same selected proportion; and the change in the duty ratio of each of said gating signals being ramped so as to occur incrementally over a plurality of cycles thereof, the incremental change per cycle being the same for both gating signals;

the ramped change in duty ratios producing said change in operating state of said converter with substantial suppression of transient high voltages and currents which would occur with a step-wise change in said duty ratios.

2. A method as claimed in claim 1, wherein the converter is employed as a ballast circuit for said lamp and the change in operating state of said converter corresponds to a change of said lamp to an ON state from an OFF state, in said OFF state the first gating signal having a duty ratio of zero % and the second gating signal having a duty ratio of 100%; lamps turn-on being effected by ramping the duty ratio of the first gating signal from 0% to 50% over a selected number of cycles thereof and concurrently ramping the duty ratio of the second gating signal from 100% to 50% over said selected number of cycles thereof.

3. A method as claimed in claim 1, wherein the converter is employed as a ballast circuit for said lamp and the change in operating state of said converter corresponds to a change in the operating state of said lamp to the OFF state from an ON state, in said ON state the first and second gating signals each having a duty ratio of 50%; lamp turn-off being effected by ramping the duty ratio of the first gating signal from 50% to 100% over a selected number of cycles thereof and concurrently ramping the duty ratio of the second gating signal from 50% to 100% over said selected number of cycles thereof.

4. A method as claimed in claim 1, wherein the converter is employed as a ballast circuit for said lamp and the change in operating state of said converter corresponds to a change in the lighting intensity of said lamp, said change being produced from an initial condition in which the first gating signal has a duty ratio between 0% and 50% and the second gating signal has a duty ratio between 50% and 100%; said change in intensity being produced by increasing the duty ratio of one of the first and second gating signals by a selected incremental amount and concurrently reducing the duty ratio of the other of the first and second gating signals by said selected incremental amount.

* * * * *